June 15, 1954   T. S. FITCHETT   2,681,105
CREASING AND SLOTTING MACHINE
Filed May 6, 1949   8 Sheets-Sheet 4

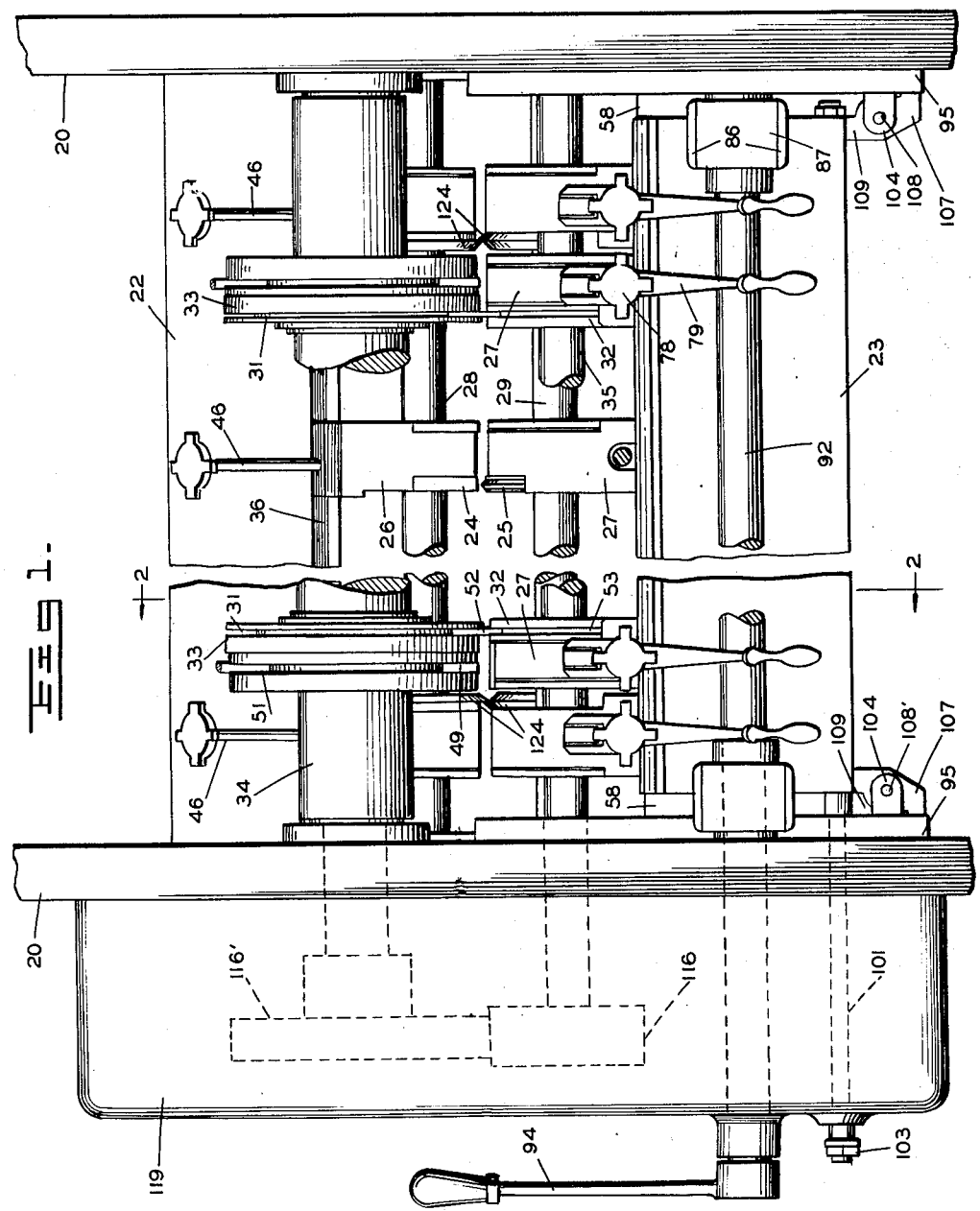

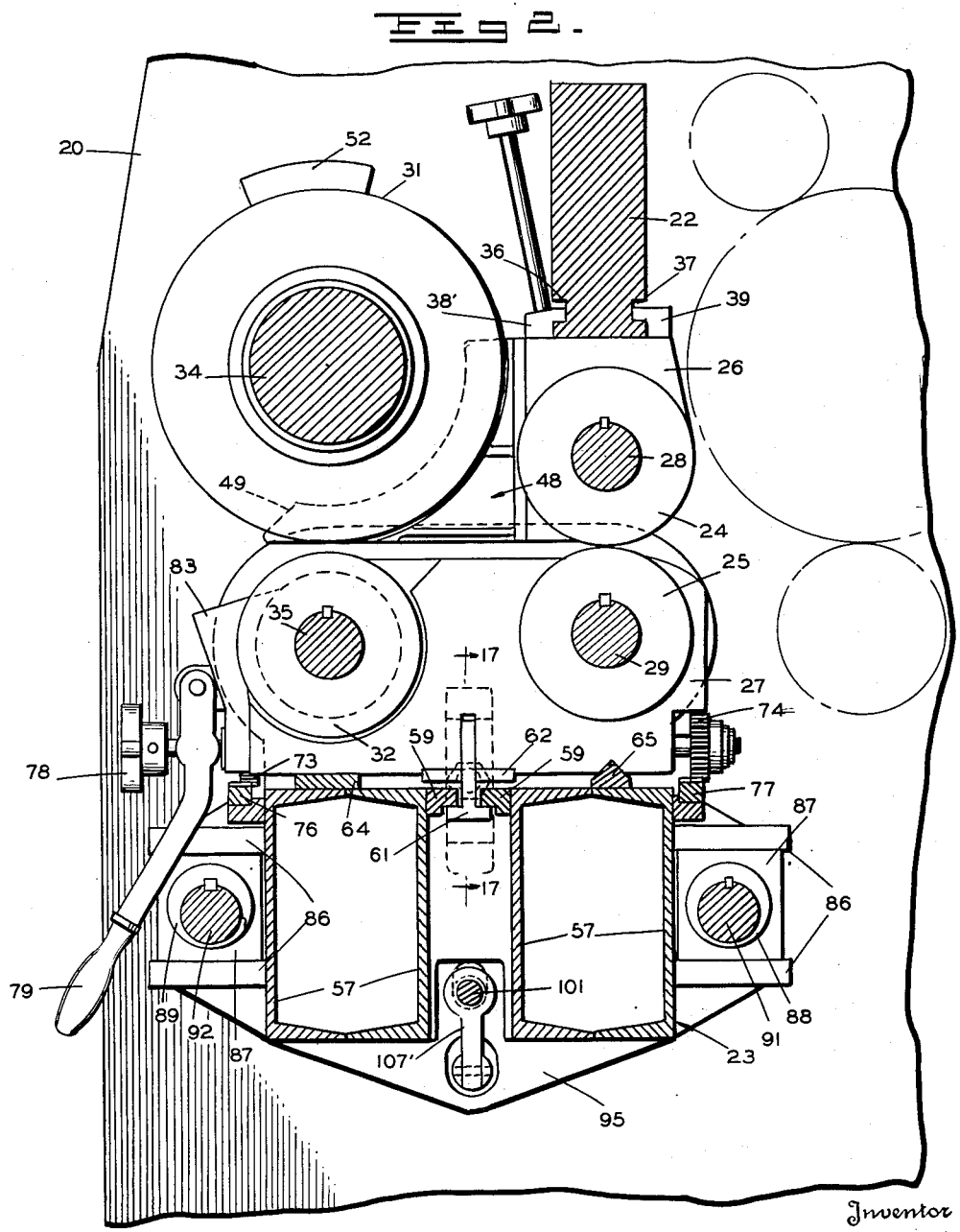

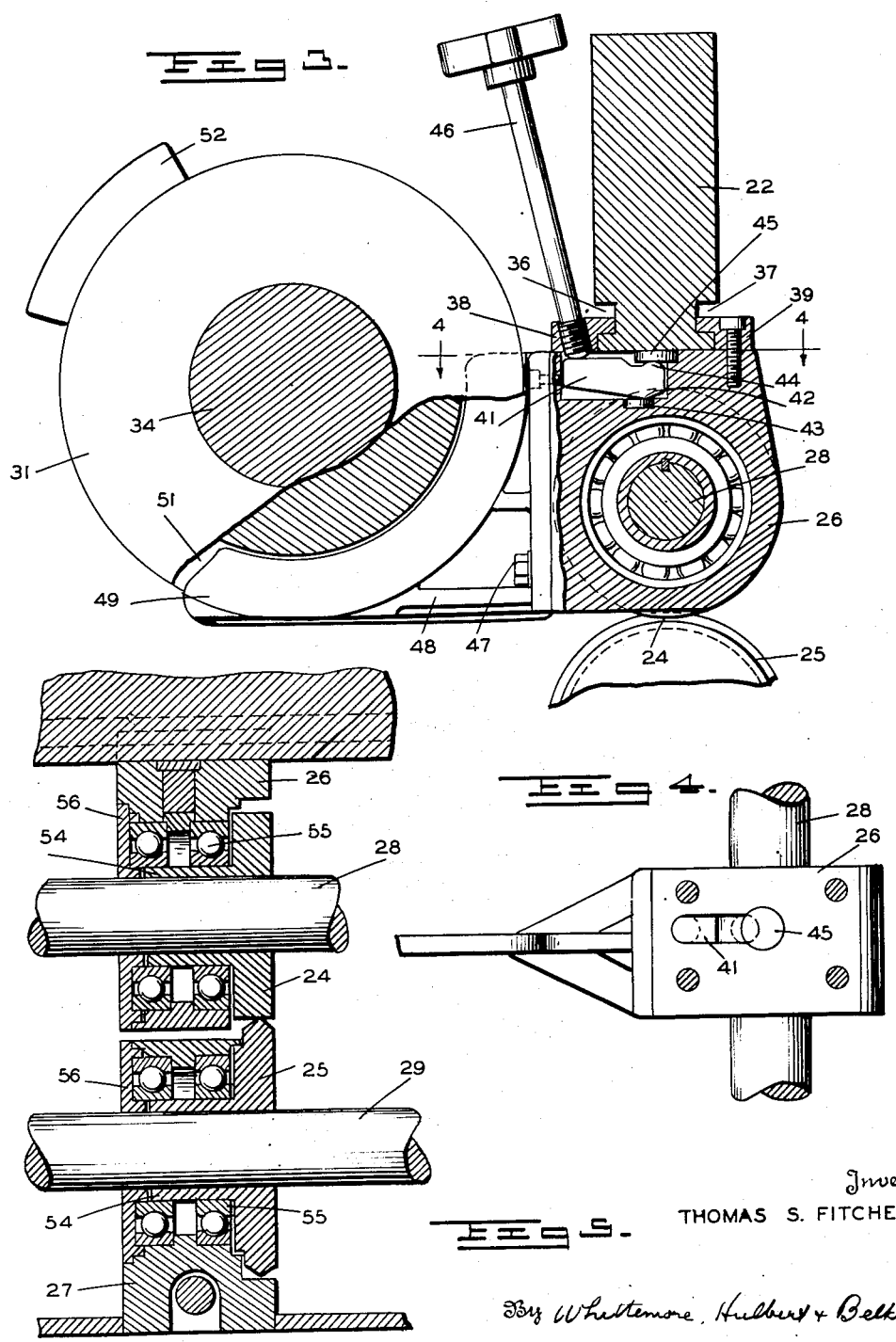

Inventor
THOMAS S. FITCHETT
By Whittemore, Hulbert + Belknap
ATTORNEYS

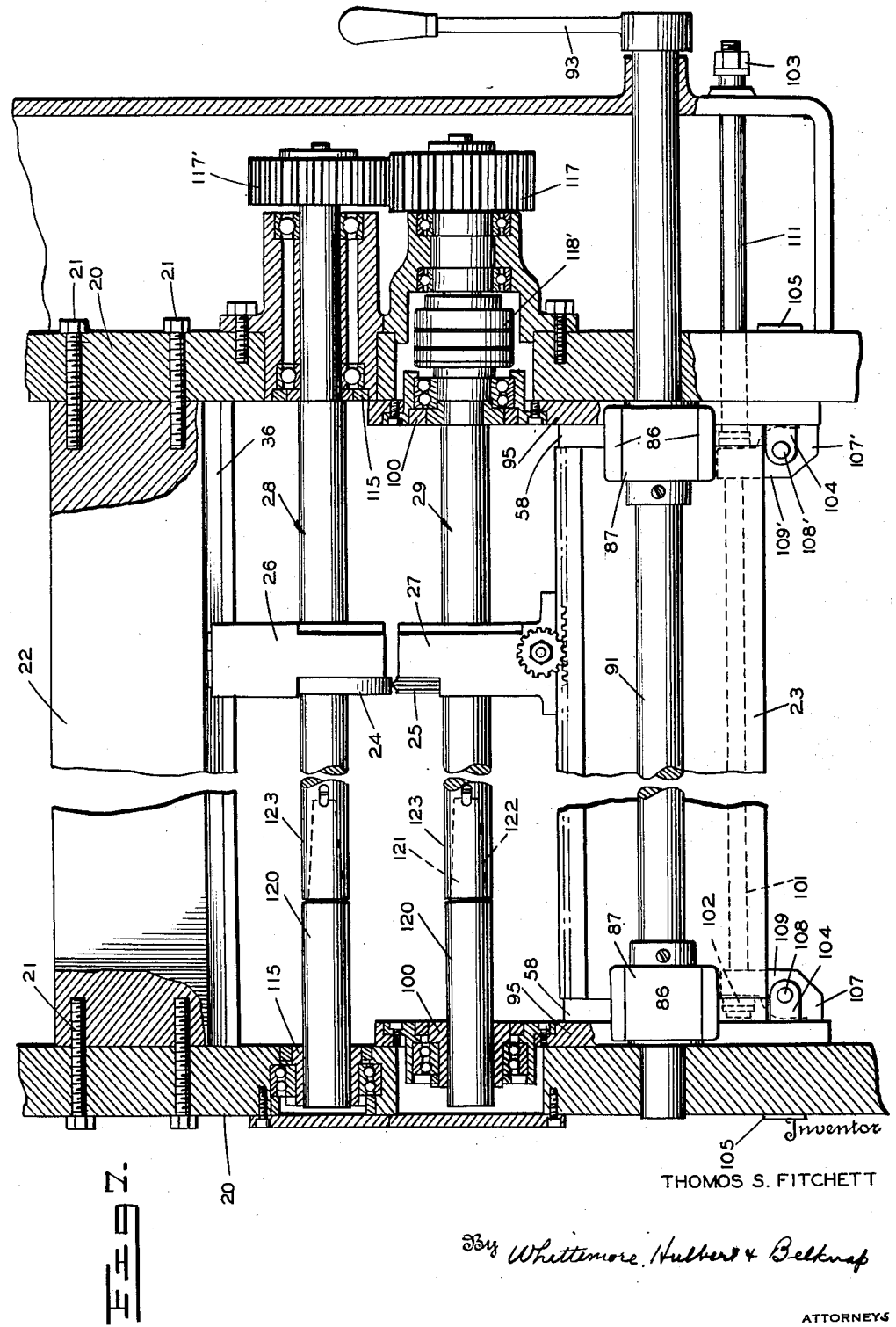

June 15, 1954 — T. S. FITCHETT — 2,681,105
CREASING AND SLOTTING MACHINE
Filed May 6, 1949 — 8 Sheets-Sheet 6
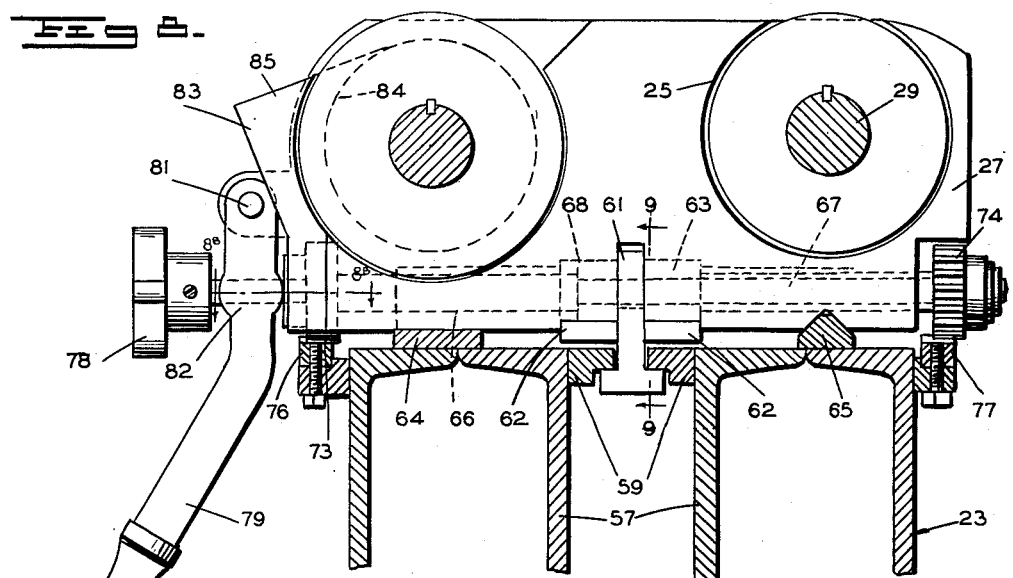
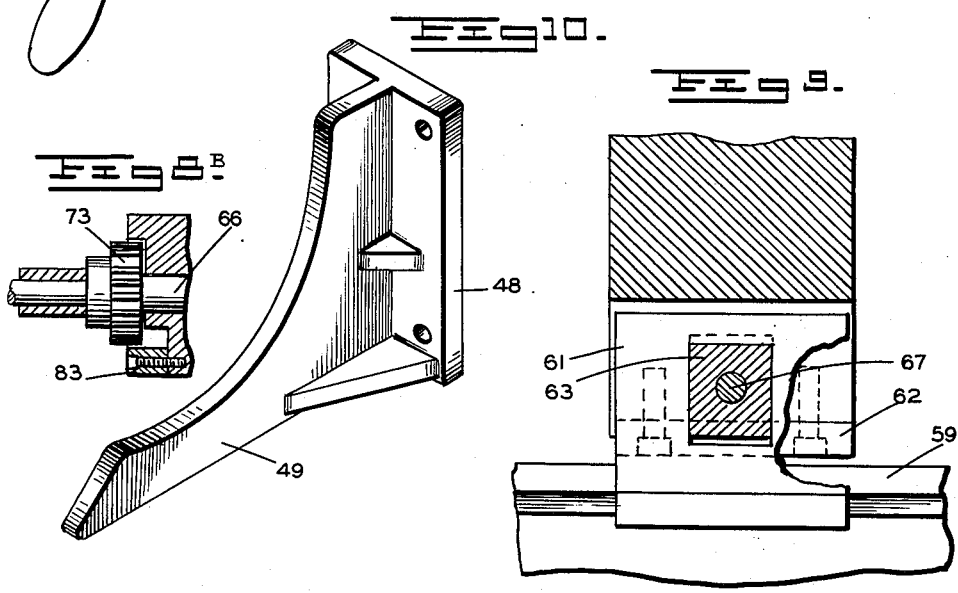
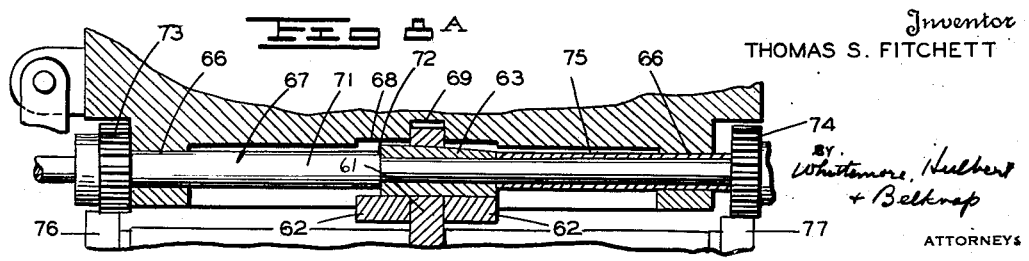
Inventor
THOMAS S. FITCHETT
By Whittemore, Hulbert & Belknap
ATTORNEYS

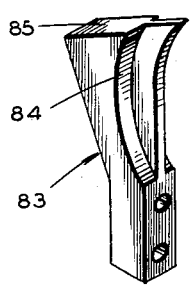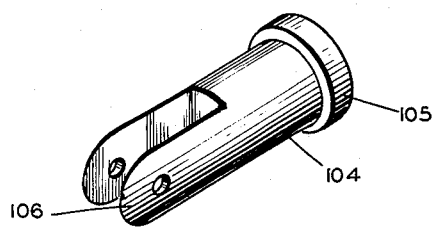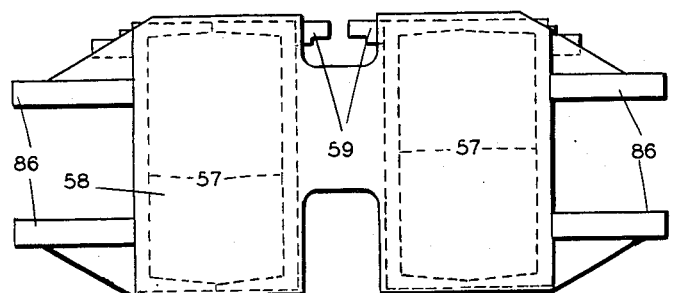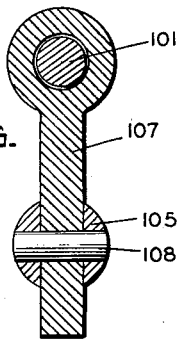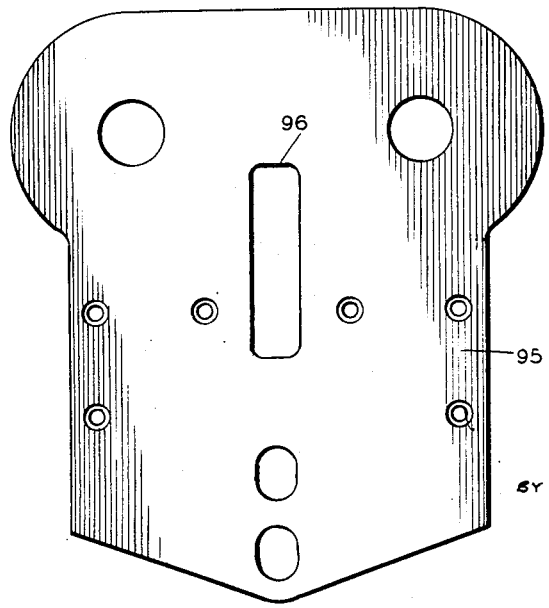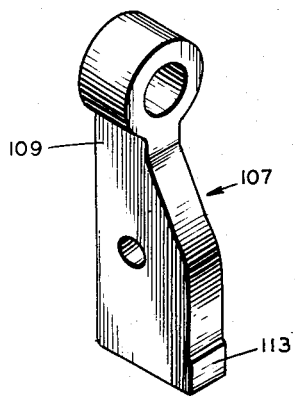

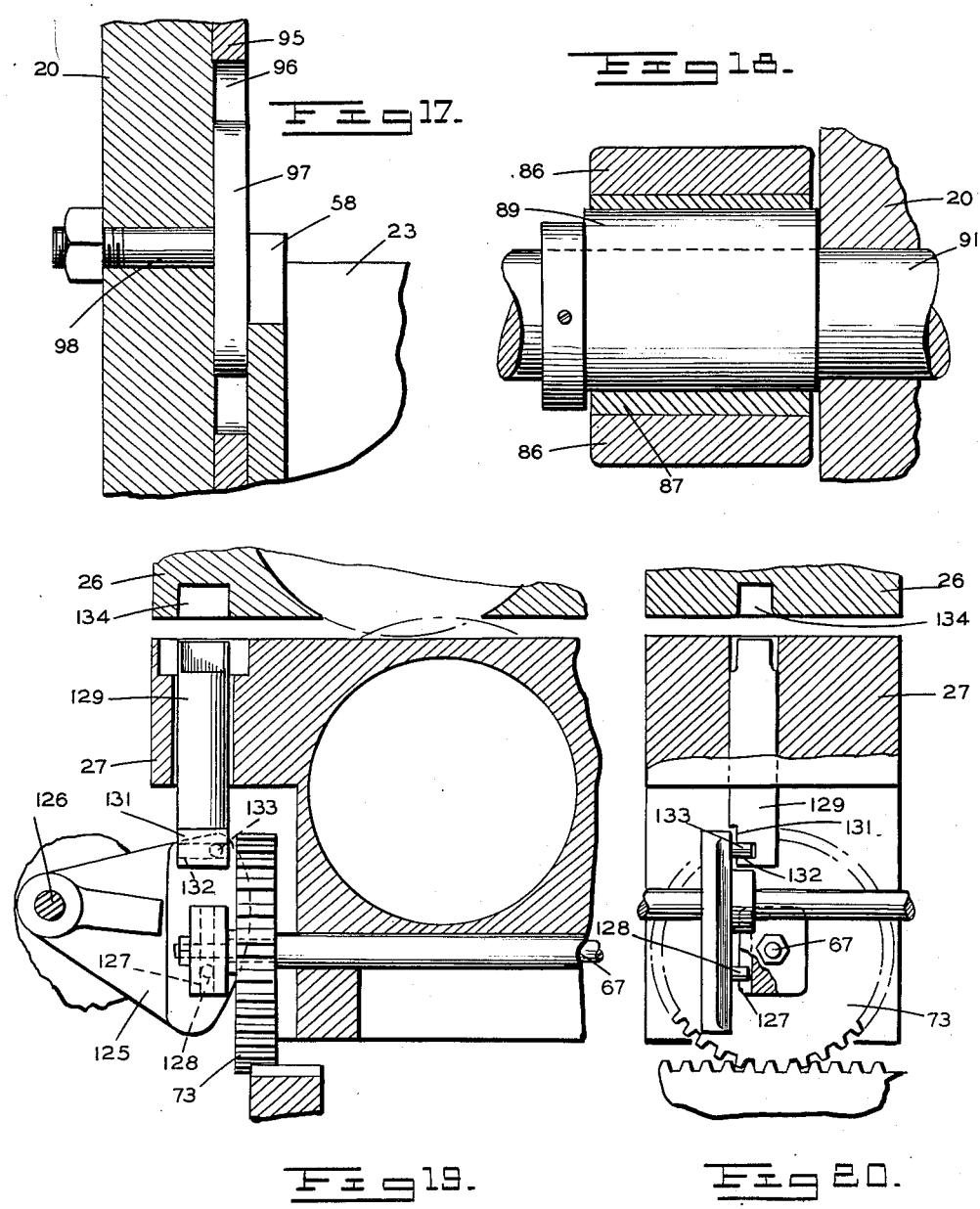

Patented June 15, 1954

2,681,105

UNITED STATES PATENT OFFICE 2,681,105

CREASING AND SLOTTING MACHINE

Thomas S. Fitchett, Glenarm, Md.

Application May 6, 1949, Serial No. 91,764

9 Claims. (Cl. 164—60)

The present invention relates to machines for creasing and slotting paper board blanks, especially with respect to those used for the manufacture of cartons. More particularly the invention pertains to supporting means for the shafts on which the creaser and slotter heads are mounted, together with improved means for providing horizontal and vertical adjustment of the heads with respect to each other.

Because of the relatively great length of the head supporting shafts on creasing and slotting machines, and since the force necessary to overcome additional resistance in paper board due to irregularities therein is fairly large, it is obvious that the vibration and deflection in the shafts frequently tends to be abnormal. This not only requires heavy shafting, but also necessitates the use of heads of large diameter. It is, therefore, one of the objects of this invention so to support the shafts for the heads that shafts and heads of substantially smaller diameter may be used, thus decreasing the space occupied by these parts and adapting them for use with short lengths of board without additional pull rolls. At the same time these supporting means obviate vibration and deflection of the shafts at points intermediate the end bearings for the shafts.

The invention further contemplates improved means for adjusting the spacing between the heads axially of their supporting shafts, these means including cooperating parts which maintain opposing heads in true alignment as well as means for moving the heads of the upper and lower rolls as a unit. These adjusting means provide for positive locking of the heads in their set positions.

Still another object of the invention is the provision of novel means for adjusting the upper and lower shafts relatively to each other to permit the accommodation of boards of various thicknesses. These means include effective locking means for the head bearing supports and provisions for moving one shaft with respect to the other in a generally vertical direction without distortion of the parts.

An additional feature of the present invention is the employment of a shaft consisting of axially separable parts to permit dismounting of the heads by withdrawing a part of the shaft, this arrangement eliminating split or hinged bearing blocks.

Other objects will be apparent from the following description of the invention when taken with the accompanying drawing in which Fig. 1 is a front elevation of a preferred embodiment of the machine, parts thereof being broken for clarity;

Fig. 2 is a section taken on line 2—2 of Fig. 1 and illustrating certain novel features referred to herein;

Fig. 3 is a side view, partly in section, of the upper beam and upper head housing showing a stripper secured to the housing;

Fig. 4 is a section taken on line 4—4 of Fig. 3;

Fig. 5 is a vertical section taken through the upper and lower creaser heads and the bearings therefor;

Fig. 7 is a rear elevation, partly in section, of the same machine;

Fig. 8 is a fragmentary section of a lower head and the lower beam, illustrating the clamping means for the head;

Fig. 8A is a vertical section taken through the head clamping means illustrated in Fig. 8;

Fig. 8B is a fragmentary horizontal section taken through the lower housing and lower stripper attached thereto;

Fig. 9 is a section taken on line 9—9 of Fig. 8;

Fig. 10 is a perspective of the upper stripper;

Fig. 11 is a perspective of the stripper for the lower stripper head;

Fig. 12 is an end view of the lower beam;

Fig. 13 is an end view of one of the end plates with a slot for a beam key;

Fig. 14 is a perspective of one of the stud bolts for the lower beam clamp;

Fig. 15 is a perspective of one of the clamps for the lower beam;

Fig. 16 is a vertical section taken through one of the clamps for the lower beam and a stud bolt;

Fig. 17 is a fragmentary section taken through one of the end plates and frame showing the pivoted beam key;

Fig. 18 is a vertical section taken through one of the eccentrics for varying the height of the lower heads;

Fig. 19 is a fragmentary vertical section taken through the creaser head housings and adjusting means showing a modified form of mechanism for interlocking the upper and lower housings for simultaneous adjustment; and Fig. 20 is an elevation, partly in section, of the mechanism illustrated in Fig. 19.

Figures 6, 6A:
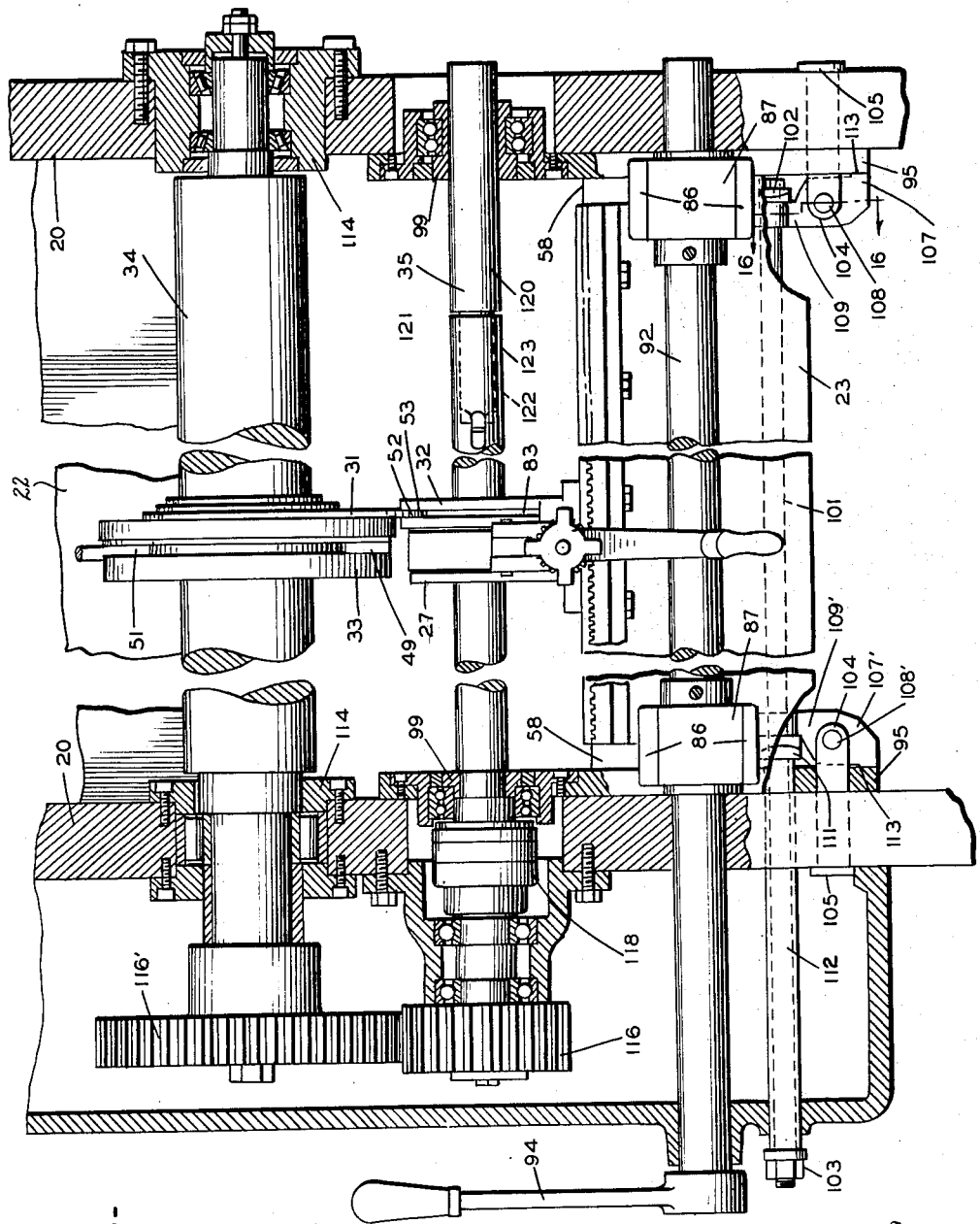
Fig. 6 is an enlarged front elevation, partly in section, of the machine shown in Fig. 1.
Fig. 6A is a fragmentary section of clamping mechanism shown in Fig. 6.

In the drawings, the side frames of the machine are indicated at 20. Secured at each end to these frames by screws 21 or other suitable means is an upper beam 22. A floating lower beam 23 is also mounted on the frames by adjustable means which will be further described hereinafter. Upper creaser heads 24 and lower creaser heads 25 are mounted for rotation and in opposed relation in upper and lower head housings or brackets 26 and 27, respectively, these heads being axially adjustable on upper and lower creaser shafts 28, 29. It is to be understood that there may be one or a plurality of pairs of creaser heads employed in the machine. There are also shown upper and lower slotter heads 31, 32, rotatably mounted in upper slotter head brackets or housings 33 and the lower housing or bracket 27 previously referred to, the slotter heads also being arranged in pairs and in opposed relation on shafts 34, 35.

As shown in Figs. 1 and 3, the upper beam 22 is a rigid one-piece metal member, the height of which is substantially greater than its width. The beam is provided on each vertical face near its lower edge with grooves or ways 36, 37, clamping brackets 38, 39, secured to housing 26, cooperating with the grooves to support the housing on the beam and permit the housing to be moved longitudinally of the beam for selectively positioning the housing and the slotter head. The upper face of housing 26 is recessed to receive a clamping bar 41, the under side of which is provided with converging faces, the apical portion 42 of this under side forming a fulcrum point which rests on a wear pad 43. The upper face of the bar has a rounded portion 44 bearing against wear pad 45, the latter engaging the lower face of beam 22. Bracket 38 is threaded to receive clamping screw 46, the rounded end of which engages the clamping bar when turned to effect clamping of the housing to the beam. Fastened to housing 26 by screws 47 is a stripper 48 having a centrally disposed integral flange 49 of arcuate form, the edge of the flange having a radius slightly larger than that of an annular groove 51 in the upper slotter head and a width less than that of the groove. Hence, if the upper slotter is moved axially of its shaft, a corresponding displacement of the upper creaser will result. The segmental knife blade 52 of the upper slotter enters and cooperates with an annular groove 53 in the lower slotter head at the slotting stage of its rotation and, when it is desired to adjust the creaser and slotter heads axially along their respective shafts, the upper slotter head is turned to position the knife blade in groove 53. The lower creaser and slotter heads being mounted in a single housing, it will be apparent that they will move as a unit. With blade 52 disposed in groove 53 and stripper flange 49 in groove 51 of the upper slotter, it is obvious that the upper heads will also move axially of their shafts as a unit with the lower heads. Thus, it is unnecessary to move and position the heads individually, as is common practice in existing machines, all of the heads being adapted to be coupled to move simultaneously and in the same direction axially in equal amounts.

Before referring to the mechanism for adjusting the heads, the manner in which the heads are mounted for rotation will be described. Since the bearings for all of the heads are substantially the same or similar to each other, only those for the creaser heads have been shown in detail in Fig. 5. As will be seen from this figure, each head is provided with an axially extending reduced bearing portion 54 fitting over and keyed to its shaft. Interposed between this bearing portion and the head housing are axially spaced ball bearings 55, there being one ball bearing adjacent each end of the housing. These bearings are closed at one end of the housing by the head and at the other end thereof by caps 56.

The lower or floating beam for supporting the housing 27 for the lower heads is illustrated in Figs. 2, 7, 8 and 12 and comprises two pairs of metal channels 57 welded to each other and to end plates 58. A space is provided between the pairs of channels and in this space are longitudinal opposed rails 59 each welded to one of the channels. Cooperating with rails 59 is an inverted T-shaped clamp member 61, there being a clamp member for each of the lower head housings 27. Secured to each lower head housing are a pair of spaced plates 62 forming a seat for a clamp wedge 63, the member 61 being disposed between the plates and having an opening in which the wedge is slidably disposed. Movement of the wedge transversely of clamp member 61 in one direction draws the clamp member against rails 59 to lock the lower head in set position, while movement of the wedge in the opposite direction releases the clamp to permit displacement of the head longitudinally of the lower beam. Welded to the lower beam are guideways 64, 65, the former having a flat bearing surface while the latter is V-shaped in cross section and cooperates with correspondingly shaped grooves or notches in the lower head housing accurately to position the lower heads. The under side of each lower head housing is recessed at 66 to permit passage therethrough of pinion shaft 67. The housing is further recessed at 68 to accommodate wedge 63 and at 69 to receive clamp member 61. The pinion shaft has a portion of increased diameter at 71, the shoulder 72 at the inner end of this portion abutting wedge 63, the shoulder at the other end thereof being engaged by pinion 73 which is keyed to the pinion shaft. Pinion 74 is keyed to the other end of shaft 67 and interposed between the latter pinion and the wedge is a clamp tube 75, the ends of which abut the wedge and pinion 74. The two pinions mesh with racks 76, 77 on the lower beams and by turning knob 78 on the pinion shaft the head housing may be moved in either direction along the ways 64, 65. Clamp lever 79 is pivoted at 81 to the housing 27, this lever having a rounded enlargement 82 adapted to engage pinion 73 to force the wedge into clamping position, or, when moved in the opposite direction, to engage knob 78 to release the clamp. A stripper member 83 is secured to the lower head housing and is so dimensioned and positioned with respect to groove 53 in the lower slotter head that it clears the sides of the groove, this stripper having an inner arcuate face 84 and an outer upwardly inclined face 85 substantially tangent to the base of groove 53, these faces meeting at a sharp angle to form a stripping edge which will effectively remove any material cut from the board by the slotter heads and tending to be held in the groove. The stripper is rigidly mounted to eliminate vibration and, because of the clearance provided between its sides and groove 53, rubbing is eliminated preventing wear on either of these parts.

Provision is made for vertical adjustment of the lower heads with respect to the upper heads, including means for clamping them securely to the machine frame after adjustment. As will be seen in Figs. 2, 6, and 7, there are welded to the lower beam channels adjacent each side frame pairs of bearing flanges 86 to accommodate laterally slidable blocks 87 in which are journaled eccentrics 88, 89, keyed to parallel eccentric shafts 91, 92. Levers 93, 94 cooperate with squared ends on the eccentric shafts. Abutting each side frame is a plate 95 secured to the lower beam and provided with a central vertical slot 96 designed to accommodate beam keys 97 having pivot stub shafts 98, the latter being journaled in the side frames. This permits the end plates and beam to be moved vertically but, at the same time, prevents lateral movement of the beam. Rotation of either or both of the eccentrics moves the blocks 87 to raise or lower the beam, lateral play being taken up by the slidable blocks. Thus the distance between the creaser heads, as well as that between the slotter heads, will be increased or decreased to accommodate different thicknesses of paper board. The lower beam is supported by the pairs of eccentric blocks and the structure is such that the lower heads are fully supported by the lower beam, the latter taking up forces transmitted from the heads during the creasing and slotting operations. When the desired vertical adjustments of the lower heads have been made, the lower beam is securely clamped to the machine frame. The clamping mechanism, as shown in Figs. 6A and 6, includes a clamp rod 101 having a fixed head 102 at one end, its other end extending through a side frame and being threaded to receive nut 103. A clamp stud 104 having a head 105 and an apertured furcated end 106 passes through each side frame, the head of each stud bearing against the outer face of the frame. Clamp levers 107, 107' are fulcrumed on pins 108, 108' in the studs, the upper arm 109 of the lever 107 being engaged by head 102. The upper arm 109' of clamp lever 107' engages a loose collar 111 on the rod. Bridging the space between collar 111 and nut 103 is a tubular spacer 112. The lower arms of the clamp levers are provided with vertical faces 113, 113' engageable with end plates 95. By tightening nut 103 the head 102 on clamp rod 101 rocks lever 107 to bring face 113 against one end plate into clamping relation therewith. At the same time spacer 112 moves collar 111 against arm 109' to move face 113' into clamping relation with the other end plate. Thus when nuts 103 are turned clockwise, there are equal forces exerted simultaneously by the clamping levers, the beam being effectively clamped to the frame after the desired adjustments of the lower heads with respect to the upper heads have been made.

The ends of the shafts for the upper heads are mounted in bearings 114, 115 secured to the side frames while the ends of the shafts for the lower heads are mounted in bearings 99, 100 secured to the movable end plates 95. The upper and lower shafts are driven in timed relation by gears 116, 116', 117, 117', couplings 118, 118' being interposed between the lower gears and the lower shafts to maintain the angular relation of the gears, regardless of the spacing between the upper and lower shafts. One type of coupling suitable for such an arrangement is shown in the patent to Greenwood No. 2,191,988. The gears are covered by a case 119 on one of the end frames and driven by a suitable motor and, if necessary, reduction gearing, the motor and reduction being conventional and not shown in the drawings.

It is to be noted that each of the shafts 28, 29, 35 is made in two sections, one section 120 being relatively short and having a tapered shank 121 fitted into a correspondingly tapered socket 122 in the longer section 123 of the shaft. The bearings for the shorter sections are axially removable as are the short sections of the shafts so that the several heads, together with their housings, may be removed from the shafts by moving them over the free ends of the longer sections. In the past it has been necessary to provide for knockdown bearings at the ends of the shaft to permit removal of the whole shaft when heads must be changed or the use of removable split heads.

In addition to the creaser and slotter heads there are provided, when necessary, slitting heads 124 which trim the edges and reduce the blanks to proper size. It is also to be understood that suitable cutters to hand holes, ventilating openings, stitch laps and the like may supplement the cutters described herein.

One mechanism providing for simultaneous axial movement of aligned heads has been described hereinbefore, but other means may be employed for such adjustment of the heads. In Figs. 19 and 20, for instance, there is shown an interlock for coupling the upper and lower heads when the clamping means therefor are released. As will be seen from these figures, there is provided a rocker arm or lever 125 pivoted to a shaft 126 suitably supported by the machine frame. Secured to the end of pinion shaft 67 is a collar having a vertical groove 127 with which pin 128 on the lever cooperates. Slidably mounted in the lower head 27 is a rod 129 having a lower flat face 131 in which there is a horizontal groove 132 cooperating with pin 133 on the lever. The upper end of the rod is formed to engage in a recess 134 in the upper creaser head. It will be apparent that there is a simultaneous rocking of lever 125, horizontal axial movement of the pinion shaft 67 and vertical movement of rod 129 so that, when the pinion shaft is moved to the right to release the clamp, the rod 129 is raised to interlock the upper and lower heads. With both upper heads connected as previously described so that they move together, it is obvious that, when the upper head 26 is interlocked with lower head 27 by means of rod 129, all of the heads will move as a unit.

From the foregoing description of the machine it will be obvious that the creaser heads and the lower slotter head are supported on ball bearings in their respective housings, the latter being attached to the upper and lower beams. These beams are structurally rigid members designed to eliminate deflection and vibration in the shafts, it being apparent that the forces exerted against the heads during the creasing and slotting operations are taken up by the ball bearings, housings and beams rather than by the shafts. Hence, the sole function of the shafts is that of driving or rotating the heads, as distinguished from the shafts of conventional machines now used in which the shafts serve both to rotate the heads and support them as well. Thus, for a given size of head, there is a definite maximum size of shaft which may be used for mounting the heads. In many, in fact in most, instances this maximum shaft size is inadequate properly to support the heads which have heavy loads imposed upon them when creasing. Deflection and vibration resulting from the inadequate beam strength of such shafts are detrimental to the creasing function and generally are responsible for non-uniform and deficient creases. The beam mountings provided by this invention may readily be made many times as rigid as the maximum shaft, thereby, for all practical purposes, eliminating deflections and vibration and assuring uniform and perfect creases. In the present invention the shafts are not subject to deflection and therefore need not be heavy. By using shafts of relatively small diameter it is obvious that smaller creaser heads and smaller lower slotter heads may be employed with a resulting saving in the spacing of the shafts. With the distance between shaft centers considerably reduced when using small diameter shafts, it is obvious that relatively small blanks may run through the machine without the necessity of providing intermediate pull rolls between the creaser heads and slotters. The use of intermediate pull rolls introduces three distinct disadvantages. One is that pull rolls, in order to function, must grip the sheets or blanks with considerable force, thereby mashing the blanks. Another disadvantage is that these pull rolls function after printing has been accomplished but before the ink is thoroughly dry, and they, therefore, tend to smear the printing. The third disadvantage is that additional gears must be introduced into the machine gear train, thereby reducing the accuracy of register of the machine. This invention eliminates all of these disadvantages. While the upper slotter head shown in the drawings is mounted in a conventional manner, i. e., on a shaft of relatively large diameter, it is contemplated that the shaft for these heads may also be light and these heads may, therefore, receive support from the upper beam shown or from another beam parallel thereto.

Of equal importance to the proper support of the shafts is the longitudinal alignment of the rolls, that is, in the direction of movement of the blanks through the machine. The lower creaser and slotter heads are mounted in a common housing or bracket which is clamped to the lower beam on guide ways, one of which is V-shaped in cross section. This V-way assures correct longitudinal alignment of the brackets, while the ball bearings for each head in the common housing accurately aligns the heads with each other. Alignment of the lower slotter with the lower creaser in present day or conventional machines is accomplished by individual adjustments of the heads, and is, therefore, subject to error. It may also be effected by means of guide plates which are subject to a great deal of wear since they must be in constant contact with either or both heads during the running of the machine. It is, of course, obvious that in time this wear will introduce errors of alignment. The common lower bracket provided in the present machine is a wear-proof device for maintaining alignment once it is established by the manufacturer. Machine operators cannot disturb this inherent alignment without dismantling the machine. Conventional construction demands that shafts serve not only to support and drive the heads, but that they also function as ways upon which the heads can be moved by sliding to reset them. Since clearance must be provided between the head and the shaft and frequent adjustments will increase this clearance, it is inevitable that a certain amount of eccentricity and axial cocking will occur when the heads are clamped to the shafts after locating. Such eccentricity and cocking tend to produce non-uniform or imperfect creases. The ball bearing mountings for the heads maintain concentricity and prevent axial cocking of the heads with respect to their supporting brackets. The V-way provided for guiding the lower bracket is inherently wear-compensating, retaining its self-aligning characteristic beyond the life of the machine.

It will be seen that quick acting clamps with readily accessible hand grips are also a distinct improvement over the older methods of clamping which necessitated the use of wrenches and similar tools. The differential clamp provided to clamp each end of the lower beam to its corresponding side frame further affords an effective additional cross tie between frames at a most important point. This additional cross tie could not be provided with the older methods of construction. The time required to set is appreciably reduced by the construction incorporated in this invention. Quick acting clamps reduce the time to loosen heads for relocating, and they also reduce the time required to lock up or firmly fasten the heads once they are located. The pinion and rack drive for the lower slotter and creaser bracket together with the interconnections for all four heads also reduces time required to set.

Modern printer slotters operate on approximately 250 sheets or blanks per minute. Thus an order of several thousand blanks may be run off in a few minutes. The business of many box plants is comprised of many small orders, and it is, therefore, necessary to set and reset their printer slotters many times each day. Set up time in some plants runs as high as 50%. In other words, non-productive time for their printer slotters equals productive time. Set up time equal to 30% of total time is not unusual in other plants and may well be taken as an average. Reduction of set up time is, therefore, highly desirable.

While a preferred form of the invention has been illustrated and described, it is to be understood that it may be modified without departing from the principal arrangement and relation of the elements thereof. It is not intended, therefore, that the claims be limited to the exact details shown in the drawings.

Having described my invention what I claim as new and desire to secure by Letters Patent is:

1. A machine of the class described comprising a frame, an upper structurally rigid beam, a lower structurally rigid beam parallel to and spaced from said upper beam, said beams being secured to said frame, bracket means cooperating with each of said beams, a pair of parallel shafts passing through one said bracket means, said pair of shafts being in substantially horizontal alignment, a second pair of horizontally aligned parallel shafts, a rotary element for operating on a paper board blank on each of said shafts, said elements being supported for rotation in said bracket means, and means for varying the spaced relation of said first mentioned pair of shafts with respect to said other pair of shafts.

2. A machine of the class described comprising a frame, a pair of parallel horizontally aligned shafts journaled in said frame, a rotary element for operating on a paper board blank on each shaft, a bracket supporting both of said elements for rotation in the bracket, both shafts passing through said bracket, a structurally rigid beam supporting said bracket, means for releasably clamping said bracket to said beam, aligned guideways at opposite ends of said beam and disposed in a plane located between said shafts for guiding vertical movement of said beam, and means disposed on opposite sides of said guideways for moving each longitudinal edge of said beam relative to said frame independently of the other longitudinal edge of said beam to provide for vertical adjustment of said shafts.

3. A machine of the class described comprising a frame, a pair of parallel horizontally aligned shafts journaled in said frame, a rotary element for operating on a paper board blank fast on each shaft, bracket means supporting said elements for rotation therein, said shafts passing through said bracket means, a beam supporting said bracket means and releasably secured thereto, aligned guideways in said frame for guiding the ends of said beam for vertical movement, and means positioned on opposite sides of said guideways for moving said beam vertically in said frame, said means comprising eccentrics having bearings fixed with respect to the frame, and blocks slidably associated with said beam, said block cooperating with said eccentrics.

4. A machine of the class described comprising a frame, a pair of parallel drive shafts journaled in said frame, a rotary element for operating on a paper board blank fast on each shaft, bracket means supporting said elements for rotation therein, said shafts passing through said bracket means, a beam supporting said bracket means and releasably secured thereto, aligned guideways in said frame for guiding the ends of said beam for vertical movement, means positioned on opposite sides of said guideways for moving said beam vertically in said frame, releasable means for clamping said beam to said frame comprising a pair of members, one pivoted to said frame adjacent each end of the frame, and means on the beam for simultaneously rocking said levers into engagement with the frame.

5. A machine as defined in claim 3 in which the means for moving the beam comprises a pair of independently rotatable spaced adjusting shafts on opposite sides of said guideways and parallel with the drive shafts, the adjusting shafts being journaled in said frame, the eccentrics being fast on said adjusting shafts and cooperating with said beam.

6. A machine of the class described comprising a frame, an upper structurally rigid beam, a lower structurally rigid beam parallel to and spaced from said upper beam, said beams being secured to said frame, bracket means cooperating with each of said beams, a pair of parallel horizontally aligned shafts passing through one of said bracket means, a second pair of horizontally aligned parallel shafts, a rotary element for operating on a paper board blank on each of said shafts, said elements being supported for rotation in said bracket means, and means for releasably connecting the upper of said bracket means with the lower of said bracket means whereby all of said elements may be moved simultaneously axially of said shafts.

7. A machine of the class described comprising a frame, an upper structurally rigid beam, a lower structurally rigid beam parallel to and spaced from said upper beam, said beams being secured to said frame, bracket means cooperating with each of said beams, a pair of parallel horizontally aligned shafts passing through one of said bracket means, a second pair of shafts disposed in substantially horizontal alignment and parallel to the first pair of shafts, a rotary element for operating on a paper board blank on each of said shafts, said elements being supported for rotation in said bracket means, a rack on said lower beam and parallel to said shafts, a pinion journaled in the lower of said bracket means and cooperating with said rack to provide for axial adjustment of the lower of said bracket means, and means for releasably connecting the upper of said bracket means with the lower of said bracket means whereby all of said elements may be moved simultaneously axially of said shafts upon rotation of said pinion.

8. A machine as defined in claim 6 in which releasably cooperating means are provided on the lower of said bracket means and on said lower beam for clamping the lower bracket means to said lower beam.

9. A machine as defined in claim 6 in which releasably cooperating means are provided on the upper of said bracket means and on said upper beam for clamping the upper bracket means to said upper beam.

References Cited in the file of this patent

UNITED STATES PATENTS

| Number | Name | Date |
| --- | --- | --- |
| Re. 20,492 | Yoder | Aug. 31, 1937 |
| 397,020 | Noyes | Jan. 29, 1889 |
| 442,878 | Geiger | Dec. 16, 1890 |
| 476,075 | Rohan | May 31, 1892 |
| 740,201 | Stimpson | Sept. 29, 1903 |
| 1,122,268 | Feeley | Dec. 29, 1914 |
| 1,750,718 | Lenston | Mar. 18, 1930 |
| 1,754,969 | Spoor | Apr. 15, 1930 |
| 1,820,142 | McJohnstone | Aug. 25, 1931 |
| 1,968,865 | Yoder | Aug. 7, 1934 |
| 2,085,835 | Strecker et al. | July 6, 1937 |